INVENTORS
**HERBERT L. PETERSON
GEORGE G. NACHT**

BY *James D. Murray*
*[signature]* ATTORNEYS

INVENTORS
**HERBERT L. PETERSON
GEORGE G. NACHT**

BY *James G. Murray*
*[signature]* ATTORNEYS

INVENTORS
HERBERT L. PETERSON
GEORGE G. NACHT though most such commercially available counters have

United States Patent Office 3,512,085
Patented May 12, 1970

3,512,085
CUMULATIVE PHASE METER USING WHOLE CYCLE AND PARTIAL CYCLE COMPARISON
Herbert L. Peterson, Washington, D.C., and George G. Nacht, Oxon Hill, Md., assignors to the United States of America, as represented by the Secretary of the Navy
Filed Mar. 3, 1967, Ser. No. 621,400
Int. Cl. G01r 25/00
U.S. Cl. 324—83                                    14 Claims

ABSTRACT OF THE DISCLOSURE

A meter which indicates cumulative phase difference between two input signals. Whole cycle phase comparison is accomplished by a reversible counter energized by zero crossing detectors. Partial cycle phase comparison is accomplished by an oscillator energized binary counter controlled by zero crossing detectors. The meter output signal is the sum of the whole cycle and partial cycle phase comparisons.

Additional features include alternate sampling of input signals to avoid ambiguity because of simultaneous zero crossing of both inputs; range adjustment and a pulse dropout detector.

BACKGROUND OF THE INVENTION

Field of the invention

This invention was developed in conjunction with a study of underwater signal propagation. This study indicated that the received signals fluctuated in phase relative to the transmitted signals. The fluctuations are caused by the medium and have a deleterious effect upon the coherence of the signal. An instrument was needed that could accurately measure the cumulative phase difference between the received and transmitter signal. The phase meter of this invention provides the needed instrument.

However, although the invention was developed with the intended environment and utility of measuring the cumulative phase difference between transmitted and received long distance underwater signals, it will be readily apparent that the invention is useful for many other purposes. In its broadest aspects the invention is considered to have utility in measuring the cumulative phase difference between any two signals which do not greatly differ in frequency.

Description of the prior art

Measurement of the relative phase between two signals has hitherto been largely limited to signals of the same frequency and (unambiguously) to phase differences of less than 360°. Such measurements have often been accomplished by such varied instrumentalities as oscilloscopes, multivibrator circuits, electrodynamometer type instruments, self-balancing delay line circuits, etc. The invention disclosed herein possesses an expanded capability compared to the above mentioned instrumentalities in measuring unambiguously phase differences much greater than 360° which can accumulate over a period of time between signals which need not be of the same frequency.

SUMMARY OF THE INVENTION

The invention disclosed herein provides a meter which indicates the cumulative phase difference between two input signals. The whole cycle phase difference is determined by a reversible counter that is energized by two zero crossing detectors that are in turn energized by the two input signals. The determination of fractional cycle phase shifts is accomplished by a binary counter that is energized by a fixed frequency oscillator and is reset under the control of the previously mentioned zero crossing detectors. The whole cycle and partial cycle phase shift determinations are added and provide the total cumulative phase difference indication which is the output of the meter.

To avoid ambiguity in the event of the simultaneous zero crossing of the two input signals, the disclosed invention provides for the alternate sampling of the input signals. Other features provided in the meter of the invention include a unique range adjustment and a pulse dropout detector.

It is therefore an object of the present invention to provide an improved cumulative phase difference meter.

Another object is to provide a phase meter wherein whole cycle phase differences are determined by a reversible counter energized by the two input signals and partial cycle phase differences are determined by a binary counter which is energized by a fixed frequency oscillator under the control of the input signals and wherein the meter output is obtained by summing the whole cycle and partial cycle phase difference determinations.

Yet another object of the present invention is the provision of a phase meter which includes a unique range adjustment and a pulse dropout detector.

A still further object of this invention is to provide a phase meter wherein the two input signals are alternately sampled to avoid the possibility of ambiguity.

BRIEF DESCRIPTION OF THE DRAWING

With the above and other objects in view, as will hereinafter more fully appear, and which will be more particularly pointed out in the appended claims, there will be described an embodiment of the invention as illustrated in the accompanying drawings in which:

DESCRIPTION OF THE INVENTION

Figure 1:
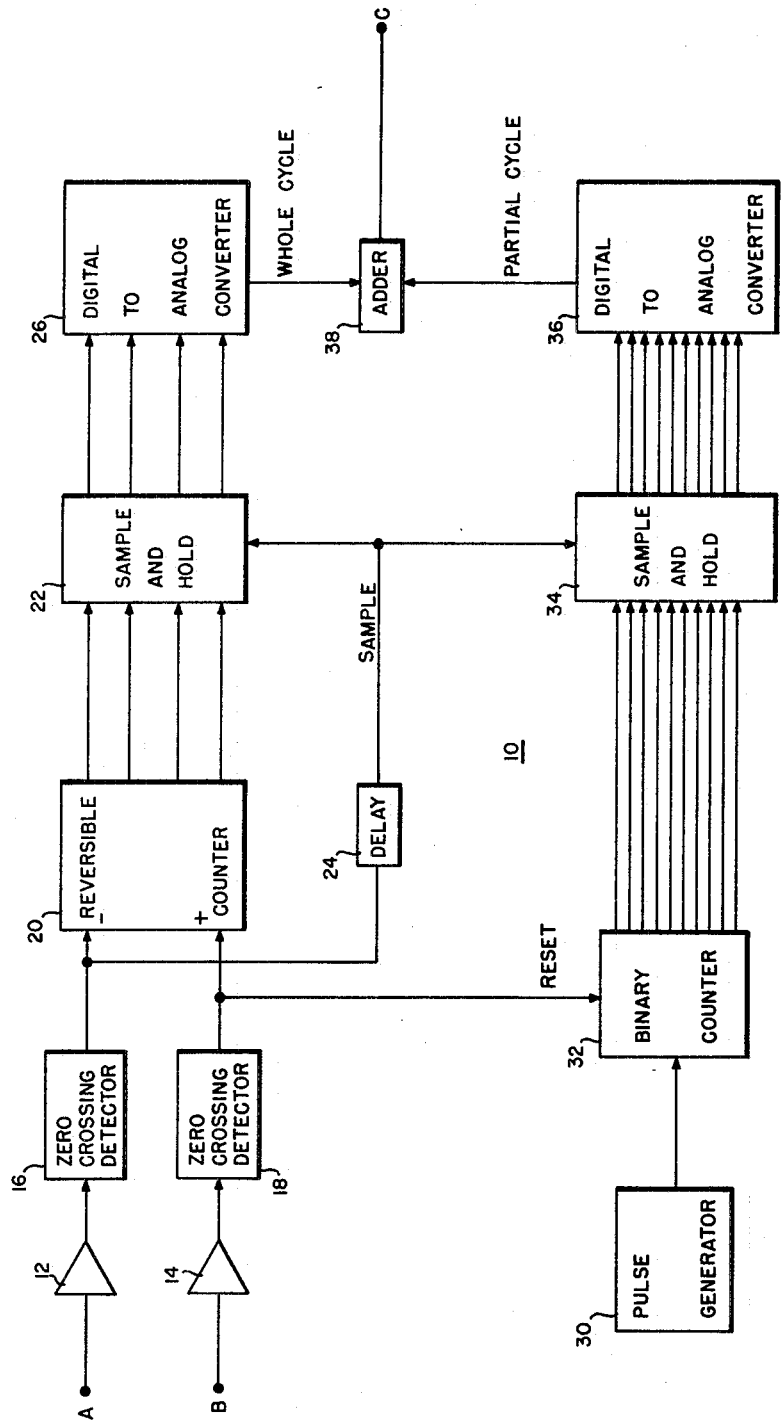
FIG. 1 illustrates a cumulative phase difference meter according to the invention.
Figure 2:
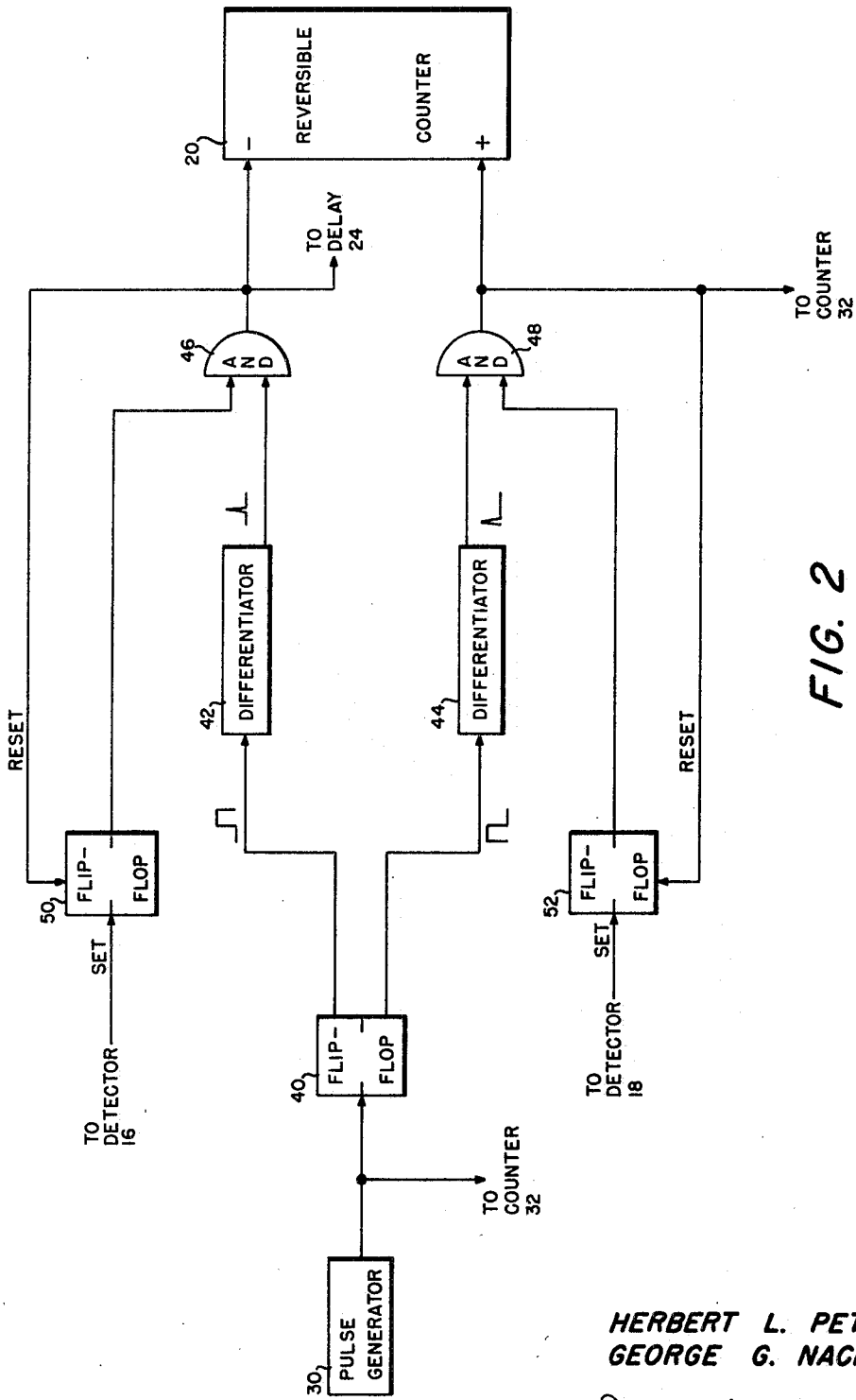
FIG. 2 shows the alternate sampling of input signals which may be incorporated into the meter of FIG. 1.
Figure 3:
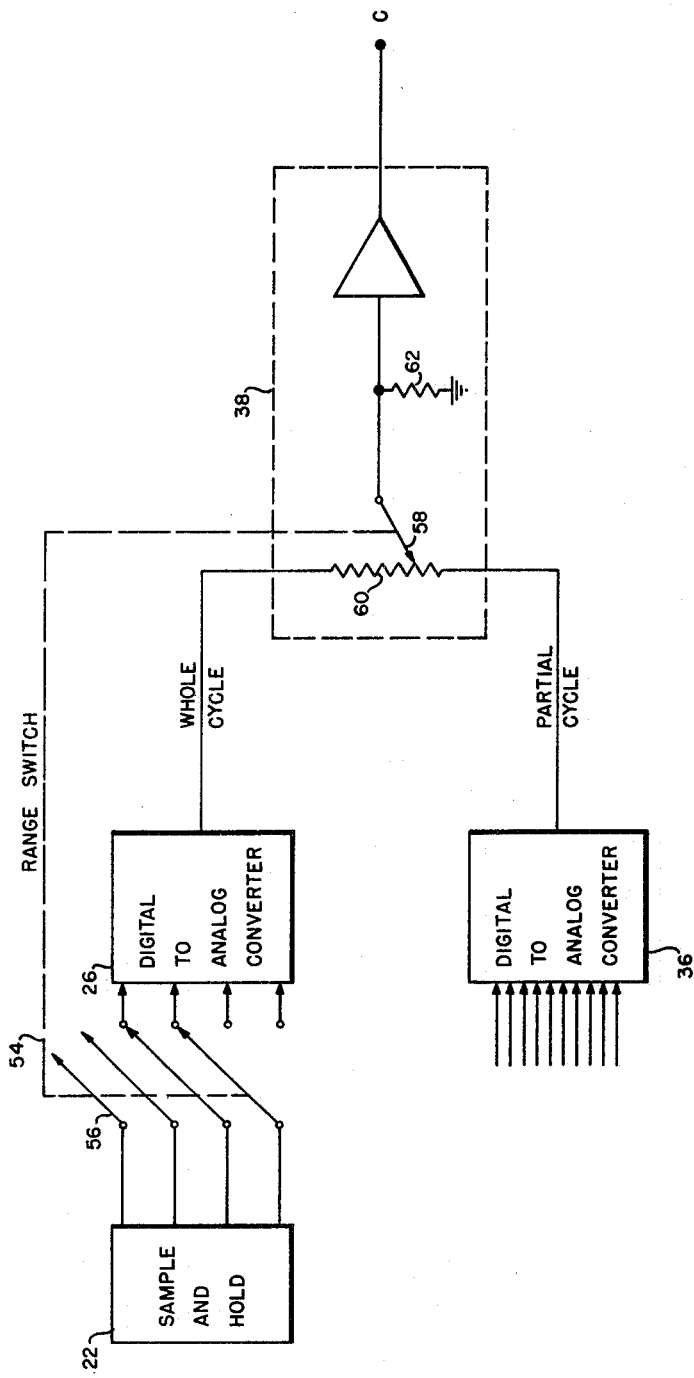
FIG. 3 shows the range adjustment feature which may be incorporated into the meter of FIG. 1
Figure 4:
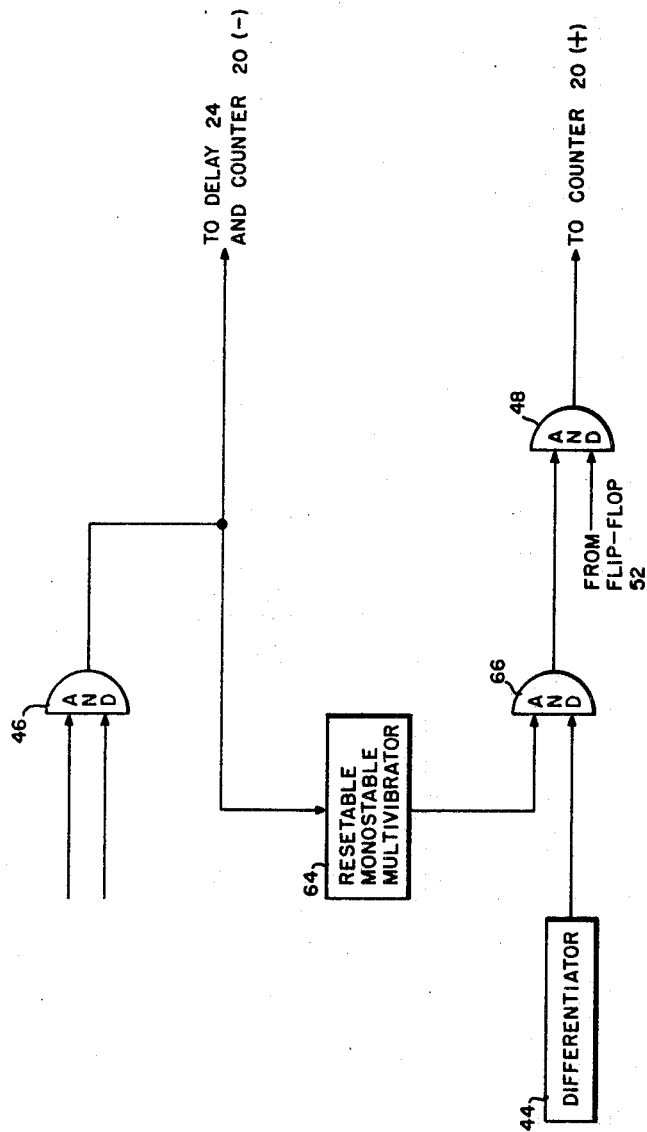
FIG. 4 illustrates a pulse dropout detector which may be incorporated into the meter of FIG. 1.

Referring now to the drawings, wherein like reference characters designate like or corresponding parts throughout the several views, there is shown in FIG. 1 a diagrammatic illustration of the basic invention to which, as may be desired, further sophistication may be added by including any or all of the features shown in FIGS. 2, 3 and 4. Two signals, which are under consideration, are connected to the input terminals A and B of the cumulative phase difference meter 10. Although the two input signals are illustrated in FIG. 1 as being merely amplified by components 12 and 14, it will be recognized that additional functions of conventional signal processing, such as filtering, D-C blocking, noise removal, etc. may also be accomplished at this stage.

The outputs of amplifiers 12 and 14 are respectively connected to conventional zero crossing detectors 16 and 18 which function in a conventional manner to produce a sharp pulse at the instant the connected signal is positively going through the zero value. The pulse output signals from the detectors 16 and 18 are connected to a reversible counter 20 which may be any one of the many commercially available counters that will provide a binary output signal that is indicative of the excess of the pulses from one source relative to the number of pulses from another source. For simplicity of illustration the output of counter 20 has been shown as a four bit binary signal although most such commercially available counters have a much greater counting capacity. As illustrated a pulse from detector 18 will add to the counter output and a pulse from detector 16 will decrease the output of counter 20.

A sample and hold device 22 is connected to the output of counter 20 and functions, somewhat as a digital buffer, to isolate Digital-to-Analog converter 26 from counter 20. Device 22, which may be in any of the known forms of sampling and storage devices which conventionally include flip-flops, capacitors, memory cores, etc., is connected to be energized by the pulse from detector 16 that has been slightly delayed by delay 24. This slight delay is desirable in order to allow the output of counter 20 to become steady, i.e. to allow the decay of the transients which occur when counter 20 changes value. When energized, the device 22 senses and stores the binary count in the output of counter 20 and applies this stored count to Digital-to-Analog converter 26 which in turn produces an analog voltage that is proportional both to the count stored in device 22 and to the whole cycle phase difference between the signals connected to terminals A and B.

Pulse generator 30, which preferably is a stable, crystal type, oscillator operating at a frequency several hundred times higher than the frequency of the incoming signals applied to terminals A and B, is connected to energize the binary counter 32. This counter is connected to be reset by the pulse from detector 18 and is illustrated as having a ten bit output although many equally suitable, commercially available, counters have a much higher counting capacity. The output signal of counter 32 is connected to sample and hold device 34 which is in turn connected to Digital-to-Analog converter 36. Components 34 and 36 are similar, both in structure and function, to the previously described components 22 and 26 and, like device 22, sample and hole device 34 is connected to delay 24 to be energized by the pulse from detector 16. Digital-to-Analog converter 36 produces an analog voltage that is proportional both to the count stored in device 34 and to the partial cycle phase difference between the signals connected to terminals A and B.

The whole cycle phase difference analog output signal of converter 26 and the partial cycle phase difference analog output signal of converter 36 are combined by adder 38 to produce a signal at terminal C which is representative of the total cumulative phase difference between the input signals applied to terminals A and B.

The invention, to the extent already described, provides a simple, very useful and accurate cumulative phase difference meter. However, in certain environments stressing extreme reliability and accuracy it is sometimes desirable to include more sophistication such as, for example, the features illustrated in FIGS. 2, 3 and 4.

One source of inaccuracy in the basic phase meter shown in FIG. 1 may occur when the signals at terminals A and B simultaneously trigger the detectors 16 and 18. In this event, certain of the commercially available meters which are otherwise suitable for use as counter 20 will register one or the other, but not both, of the pulses from the detectors 16 and 18. The feature of the invention illustrated in FIG. 2 avoids this source of inaccuracy.

In FIG. 2, the pulse generator 30, which is of course also connected to binary counter 32, is connected to bistable multivibrator (flip-flop) 40, the two outputs of which are in turn connected to unidirectional differentiators 42 and 44 and produce the time sequenced potential wave forms shown adjacent to the respective connecting leads. As an obvious variation, the differentiators 62 and 64 could be omitted and gates 46 and 58 controlled directly by the flip-flop 40. Since, as previously mentioned, the operating frequency of generator 30 is several hundred times higher than the frequency of the incoming signals applied to terminals A and B, it is apparent that the unipolar pulse outputs of differentiators 42 and 44, which are connected as inputs to AND gates 46 and 48, will be at a frequency at least a hundred times higher than the terminal A and B input signals. Also connected as an input signal to AND gate 46 is the output of bistable multivibrator (flip-flop) 50 which is connected to be set by the pulse output of detector 16 and reset by the output signal of AND gate 46. The output signal of AND gate 46 is also connected to the decreasing count terminal of counter 20 and to the delay 24. Similarly AND gate 48 is connected to the output of bistable multivibrator (flip-flop) 52 which is connected to be set by the pulse output of detector 18 and reset by the output signal of AND gate 48. The output signal of AND gate 48 is also connected to the increasing count terminal of counter 20 and to the reset terminal of counter 32.

It is probably now apparent to the reader that because of the alternated enabling of AND gates 46 and 48 (basically by flip-flop 40) the counter 20 will not receive simultaneous signals at the increasing and decreasing count terminals and that, therefore, this source of inaccuracy will be avoided by the feature of the invention illustrated in FIG. 2.

In certain uses of the invention, the operator may know that the cumulative phase difference between the signals at terminals A and B will remain small. In this event, the maximum usefulness of the basic meter of FIG. 1 will not be realized because the output signal at terminal C will also be small. The feature of the invention illustrated in FIG. 3 avoids this limitation to the usefulness of the invention by including a Range Switch 54.

As shown in FIG. 3 the Range Switch 54 includes a set of movable contacts 56 located between the sample and hold device 22 and the Digital-to-Analog converter 26. Also included in Range Switch 54, and mechanically connected to the contacts 56, is an adjustment 58 in the adder 38. As illustrated in typical form, the adder 38 includes a potentiometer 60, the wiper of which is connected to ground through the load resistor 62. The voltage developed by resistor 62, after suitable amplification, is the meter output signal at terminal C. In the typical form illustrated, the adjustment 58 in the adder 38 consists of the mechanical positioning of the wiper of the potentiometer 60. The position of the wiper must, of course, be correlated to the position of contacts 56 in such a manner that the output voltage of the meter at terminal C is indicative of the sum of the whole cycle and partial cycle signals produced by the Digital-to-Analog converters 26 and 36.

As illustrated in FIG. 3, the Range Switch 54 is set so that the two least significant bits from the sample and hold device 22 are connected to the two most significant inputs of the Digital-to-Analog converter 26, thereby obtaining a much improved resolution in the output signal at terminal C. The adjustment 58 is mechanically connected by the Range Switch 54 to be so positioned that the partial count signal from converter 36 is correctly proportional to the whole cycle signal from converter 26.

Another source of occasional inaccuracy occurs when the signals are accompanied by a high noise background. In these circumstances a zero crossing of one of the input signals may not be detected by one of the detectors 16 or 18. The pulse dropout detector feature of the invention illustrated in FIG. 4 avoids this source of inaccuracy by sensing the malfunction of the detector in one signal channel and causing a similar malfunction in the other signal channel.

In FIG. 4 there is illustrated the circuitry required to sense and correct for the missing of a zero crossing by detector 16. The entirely similar and obvious circuitry required to sense and correct for a malfunction of detector 18 is not shown.

The pulse dropout detector illustrated in FIG. 4 includes a resetable monostable multivibrator 64 connected to the output of AND gate 46. Upon being energized by the signal from gate 46, the multivibrator 64 will produce a signal which enables AND gate 66 to pass a signal from differentiator 44 to AND gate 48. The period of the multivibrator 64 is slightly longer than the expected period of the input signal at terminal A (which energizes the signal channel including AND gate 46). In the event the zero crossing detector 16 fails to detect a crossing of the input signal, the predetermined period of the signal produced by multivibrator 64 will expire and the multivibrator signal will be terminated, thereby disabling AND gate 66 and blocking the signals from differentiator 44 until such time as detector 16 detects a zero crossing of the input signal at terminal A.

It will be apparent that there has been disclosed a cumulative phase difference meter 10 wherein the input signals at terminals A and B energize reversible counter 20 to produce a binary count of the whole cycle phase difference of the input signals. This binary count is converted to analog form by converter 26 and added by adder 38 to the partial cycle phase difference from converter 36. The latter signal is an analog of the binary count performed on the output of pulse generator 30 by counter 32 and sample and hold device 34 under the control of the input signals. The output of adder 38, being the sum of the whole cycle and partial cycle signals, is indicative of the total phase difference and is present at terminal C.

To avoid inaccurate operation of counter 20 in the event of simultaneous energization by the input signals at terminals A and B, the feature of the invention illustrated in FIG. 2 utilizes the generator 30 to drive flip-flop 40 and thereby alternately allow the energization of counter 20 by the signal channels connected to terminals A and B.

The feature of the invention illustrated in FIG. 3 provides for an improved resolution of the output signal at terminal C. This is accomplished by a Range Switch 54 that selectively changes the interrelation of the significant bit connections between the sample and hold device 22 and the Digital-to-Analog converter 26 and simultaneously, by appropriate mechanical linkage, positions an adjustment 58 in the adder 38 to preserve the correct proportionality between the whole cycle signal and the partial cycle signal.

To avoid inaccurate operation of the meter 10 because of high noise content in one of the signals at terminals A or B, the feature of the invention illustrated in FIG. 4 provides a pulse dropout detector which functions to sense the malfunction of the zero crossing detector (16 or 18) in one signal channel and causing a similar malfunction in the other signal channel. This is accomplished by interconnecting the two signal channels with monostable multivibrators having a period slightly longer than the period of the input signals at the terminals A and B. When a zero crossing is missed in one signal channel the multivibrator period will expire and thereby disable the other signal channel.

Obviously many conventional components, such as off-on switches, have not been shown and many modifications and variations of the present invention are possible in the light of the above teachings. It is therefore to be understood, that within the scope of the appended claims, the invention may be practiced otherwise than as specifically described.

The invention described herein may be manufactured and used by or for the Government of the United States of America for governmental purposes without the payment of any royalties thereon or therefor.

What is claimed and desired to be secured by Letters Patent of the United States is:

1. A cumulative phase meter having two input terminals and one output terminal comprising:
   whole cycle means connected to said two input terminals to produce a whole cycle signal representative of the whole cycle cumulative phase difference between signals applied to said input terminals;
   partial cycle means connected to said two input terminals to produce a partial cycle signal representative of the partial cycle cumulative phase difference between signals applied to said input terminals and
   adding means connected to said whole cycle means and to said partial cycle means for adding said whole and partial cycle signals to produce at said output terminal a combined signal representative of the total cumulative phase difference between the signals applied to said input terminals, said adding means being capable of varying, by preselected and adjustable amounts, the proportion of whole and partial cycle signals in said combined signal.

2. A cumulative phase meter as set forth in claim 1 wherein said whole cycle means comprises:
   first and second zero crossing detectors connected individually to said two input terminals;
   a reversible counter connected to said first and second zero crossing detectors to produce a binary signal representative of the whole cycle cumulative phase difference between the signals applied to said input terminals and
   first converter means connected to said reversible counter to change said whole cycle binary signal to an analog signal representative of the whole cycle cumulative phase difference between the signals applied to said input terminals.

3. A cumulative phase meter as set forth in claim 2 wherein said partial cycle means comprises:
   generator means producing a signal having a frequency which is several hundreds of times higher than the signals applied to said input terminals;
   binary counting means connected to said generator means and to said first and second zero crossing detectors to produce a binary signal representative of the number of cycles produced by said generator means in the time period between when said binary counting means receives a signal from said first and second zero crossing detectors and
   second converter means connected to said binary counting means to change said binary counting means binary signal to an analog signal representative of said number of cycles and to the partial cycle cumulative phase difference between signals applied to said input terminals.

4. A cumulative phase meter as set forth in claim 3 and further including alternating enabling means which alternately enable said reversible counter to be energized by said first and second zero crossing detectors.

5. A cumulative phase meter as set forth in claim 4 wherein said alternating enabling means comprises:
   a flip-flop having two output conditions and connected to said generator means and
   first and second gating means, each responsive to different ones of said two output conditions of said flip-flop, to alternately enable said first and second zero crossing detectors to energize said reversible counter.

6. A cumulative phase meter as set forth in claim 3 and further including range switch means which simultaneously varies the connection between said first converter means and said reversible counter and adjusts said preselected proportioning of said adding means.

7. A cumulative phase meter as set forth in claim 3 and further including pulse dropout detector means which senses the malfunction of one of said first or second zero crossing detectors and thereafter blocks the other of said first or second zero crossing detectors from energizing said reversible counter.

8. A cumulative phase meter as set forth in claim 5 and further including:
   range switch means which simultaneously varies the connection between said first converter means and said reversible counter and adjust said preselected proportioning of said adding means and
   pulse dropout detector means which senses the malfunction of one of said first or second zero crossing detectors and thereafter blocks the other of said first or second zero crossing detectors from energizing said reversible counter.

9. A whole cycle cumulative difference counting circuit having two input terminals connected to receive signals the cycles of which are to be compared and comprising:
first and second zero crossing detectors connected individually to said two input terminals and individually producing an output whenever the connected signal positively goes through a zero value;
a reversible counter having a plurality of outputs and connected to be energized in a positive sense by each output of said first zero crossing detector and to be energized in a negative sense by each output of said second zero crossing detector and to produce at said plurality of outputs a binary signal representative of the difference between the number of times said reversible counter is energized by said first and second zero crossing detectors and
converter means having a plurality of inputs, a variable number of which are connected to a variable number of said plurality of outputs of said reversible counter to produce an analog signal that is variable representative, according to said variable number of connections, of said binary signal produced by said reversible counter.

10. A whole cycle cumulative difference counting circuit as set forth in claim 9 and further including alternating enabling means which alternately enable said reversible counter to be energized by said first and second zero crossing detectors.

11. A whole cycle cumulative difference counting circuit as set forth in claim 10 wherein said alternating enabling means comprises:
generator means producing a signal having a frequency which is several hundred of times higher than the signals applied to said input terminals;
a flip-flop having two output conditions and connected to said generator means and
first and second gating means, each responsive to different ones of said two output conditions of said flip-flop, to alternately enable said first and second zero crossing detectors to energize said reversible counter.

12. A whole cycle cumulative difference counting circuit as set forth in claim 9 and further including pulse dropout detector means which senses the malfunction of one of said first or second zero crossing detectors and thereafter blocks the other of said first or second zero crossing detectors from energizing said reversible counter.

13. A whole cycle cumulative difference counting circuit as set forth in claim 11 further including:
a range switch which changes said variable representation of said analog signal by changing the number of connections by which said converter means receives the signal bits of said reversible counter binary signal and
pulse dropout detector means which senses the malfunction of one of said first or second zero crossing detectors and thereafter blocks the other of said first or second zero crossing detectors from energizing said reversible counter.

14. An adjustable adding circuit comprising:
first and second Digital-to-Analog converter means, each having bit terminals to receive input signals in binary form, to each produce analog output signals representative of said binary input signals;
a potentiometer having a resistor connected between the outputs of said first and second Digital-to-Analog converters and a variably positioned wiper connecting said resistor to ground through a load impedance and
switch means simultaneously varying the position of said wiper and the connections by which said bit terminals receive said binary input signals.

References Cited

UNITED STATES PATENTS

| | | | |
|---|---|---|---|
| 2,827,233 | 3/1958 | Johnson et al. | 324—115 X |
| 2,911,641 | 11/1959 | Kohler. | |
| 3,069,623 | 12/1962 | Murgio | 324—79 X |
| 3,200,340 | 8/1965 | Dunne. | |
| 3,209,254 | 9/1965 | Hossmann. | |
| 3,315,253 | 4/1967 | Geller. | |
| 3,329,895 | 7/1967 | Lenz. | |

OTHER REFERENCES

IBM Technical Disclosure Bulletin, vol. 2, No. 3 (July, 1960) p.35.

ALFRED E. SMITH, Primary Examiner

U.S. Cl. X.R.

328—133